Patented Dec. 7, 1943

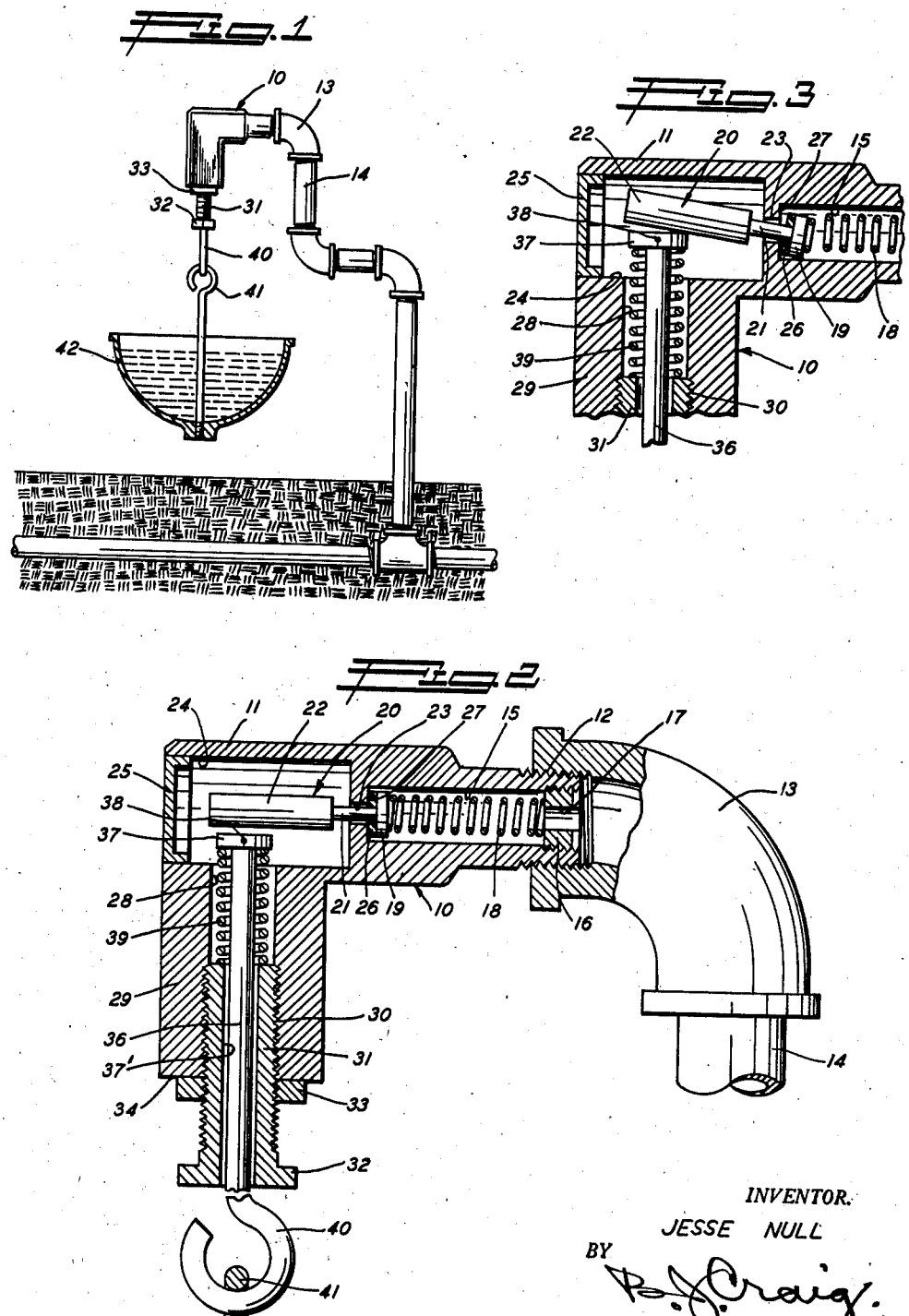

2,336,120

UNITED STATES PATENT OFFICE 2,336,120

WATERING APPARATUS

Jesse Null, Arcadia, Calif.

Application September 14, 1943, Serial No. 502,257

9 Claims. (Cl. 119—81)

This invention relates to a watering apparatus.

The general object of this invention is to provide a novel weight controlled poultry and live stock watering apparatus.

Another object of the invention is to provide a poultry and live stock watering apparatus including novel flow adjusting means.

A further object of the invention is to provide novel valve means for a watering apparatus.

Other objects and the advantages of this invention will be apparent from the following description taken in connection with the accompanying drawing, wherein:

Fig. 1 is a side elevation, with parts in section, showing a poultry and live stock watering device embodying the features of my invention;

Fig. 2 is an enlarged, central, fragmentary section showing the device, and

Fig. 3 is a fragmentary, sectional view similar to Fig. 2, showing the parts in another position.

Referring to the drawing by reference characters, I have shown my invention as embodied in a poultry watering device which is indicated generally at 10. As shown the device includes a body 11 which is generally L shaped and has a reduced threaded end 12 which is threaded into an L 13 on a supply pipe 14.

The portion 12 at one end has a bore 15 thereon. The outer end of the bore is threaded to receive a threaded collar 16 which has a central hole 17 therethrough. The collar 16 is engaged by one end of a coil spring 18; the other end of the spring 18 engages the head 19 of a valve 20. The head 19 is connected by a reduced central portion 21 with an enlarged cylindrical inner end portion 22.

The portion 21 extends through a reduced bore 23 in the body and the portion 22 is arranged in an enlarged chamber 24.

The outer end of the chamber 24 is closed by a cap 25 which may be frictionally held in place.

The portion 21 of the valve member is surrounded by a gasket 26 which engages the shoulder 27 defined by the bore 23 and thus normally stops flow from the hole 17 to the bore 15 thence to the bore 23 and to the chamber 24.

The described construction is such that when the portion 22 is moved laterally as shown in Fig. 3 (by means to be later described) the gasket 26 is moved away from the shoulder 27 and thus water is allowed to flow into the chamber 24 whence it passes outwardly through a bore 28 in a portion 29 of the body. The bore 28 is threaded at its outer end as at 30 to receive a threaded plug 31 which has a polygonal head 32 thereon. A lock nut 33 engages the stem 31 and the end 34 of the body portion 29 to hold the stem in adjusted position.

A control member 36 extends through a bore 37 in the stem. At its inner end the member 36 has a head portion 37 held thereon by a pin 38. Head portion 37 is engaged by one end of a spring 39, the other end of the spring abutting the inner end of the plug 31. At its lower end the control member 36 is shown as provided with a hook 40 which is engaged by an eye 41 on a water receptacle.

In use the device is mounted as shown and the nut 33 is adjusted so that the control member 36 will be held in such position that the weight of the water and the container 42 when the proper amount of water is in the container will just move the head 37 away from the portion 22 of the valve. As the water in the container 42 is removed as by poultry drinking therefrom, or by evaporation, the weight of the water is lessened, enabling the spring 39 to push the head 37 upwardly and thus push the portion 22 of the valve upwardly and rock the valve to the position shown in Fig. 3, whereupon water will flow through the hole 17, bore 15, bore 23 and chamber 24 to the sleeve 31. The control member 36 has a diameter slightly less than that of the bore 37' so that a passage is formed down which water will trickle and will drop into the container 42. This action will continue until the weight of the container causes the valve to close.

Having thus described my invention, I claim:

1. In a poultry watering valve comprising a casing having an inlet and an outlet, a valve seat in the casing, a tiltable valve adapted to engage said seat, a stem on said valve, a receptacle supporting member movable in said casing, said valve stem being in the path of movement of said member, and resilient means to urge said member inwardly in the casing.

2. A poultry apparatus comprising a body having a bore therein, a valve seat in said bore, said body having a chamber communicating with said bore, a tiltable valve having a shank extending into the chamber, said valve engaging said seat, means to normally urge the valve against the seat, said body having a second bore intersecting said chamber, a control member arranged in said second bore, there being a passage for fluid about the control member, means to attach a receptacle to the control member, and means to normally urge the control member inwardly in the chamber, said control member being disposed to move in a path whereby it engages the inner end of the valve shank to thereby unseat the valve.

3. A poultry watering apparatus comprising an L-shaped body, one leg of said L having a bore therein, said one leg having a valve seat in said bore, said body having a chamber communicating with said bore, a tiltable valve having a shank extending into the chamber, said valve engaging said seat, means to normally urge the valve against the seat, the other leg of said body having a second bore communicating with said chamber, a hollow sleeve in said second bore, a control member arranged in said sleeve, said control member having a diameter less than the internal diameter of the sleeve, said control member projecting outwardly beyond the sleeve, and a means to normally urge the control member inwardly in the chamber, said control member being disposed to move in a path whereby it engages the inner end of the valve shank to thereby unseat the valve.

4. A poultry watering apparatus comprising an L-shaped body, one leg of said L having a bore therein, said one leg having a reduced bore at the inner end of said first bore, said body having a chamber communicating with said reduced bore, said reduced bore providing a shoulder, a tiltable valve having a shank extending through said reduced bore and into the chamber, said valve having a head thereon engaging said shoulder, means to normally urge the valve against the shoulder, the other leg of said body having a second bore communicating with said chamber, a hollow sleeve in said second bore, a control member arranged in said sleeve, said control member having a diameter less than the internal diameter of the sleeve, said control member projecting outwardly beyond the sleeve, and means to normally urge the control member inwardly in the chamber, said control member being disposed to move in a path whereby it engages the inner end of the valve shank to thereby unseat the valve.

5. A poultry watering apparatus comprising a body having a chamber therein and having a pair of bores communicating with said chamber, one of said bores having a reduced portion forming a shoulder, an apertured plug in the outer end of said one bore, a tiltable valve member engaging said shoulder and having a shank extending through said reduced bore into the chamber, means to normally urge the valve head against the shoulder, a hollow sleeve in the outer end of said other bore, a control member arranged in said sleeve and extending into said second bore, said control member having a diameter less than the internal diameter of the sleeve, said control member projecting outwardly beyond the sleeve, and means to normally urge the control member inwardly into the chamber, said control member being disposed to move in a path whereby it engages the enlarged inner end of the valve shank to thereby unseat the valve.

6. A poultry watering apparatus comprising a body having a chamber therein and having a pair of bores communicating with said chamber, one of said bores having a reduced portion forming a shoulder, an apertured plug in the outer end of said one bore, a valve member having a head in said one bore and having a shank extending through said reduced bore and into the chamber, the portion of said shank in the chamber being enlarged, a spring in said one bore, said spring engaging said valve and said plug to normally urge the valve head against the shoulder, a hollow sleeve in the outer end of said other bore, a control member arranged in said sleeve and extending into said second bore, said control member having a diameter less than the internal diameter of the sleeve, said control member projecting outwardly beyond the sleeve, the inner end of said control member having a head thereon, and a spring surrounding the control member and engaging the control member head and the sleeve to normally urge the control member inwardly into the chamber, said control member head being disposed to move in a path whereby it engages the enlarged inner end of the valve shank to thereby unseat the valve.

7. A poultry watering apparatus comprising an L-shaped body, one leg of said L having an outwardly opening bore therein, a plug in the outer end of said bore, said plug having an axial hole, said one leg having a reduced bore at the inner end of said first bore, said body having a chamber communicating with said reduced bore, said reduced bore providing a shoulder, a valve having a shank extending through said reduced bore and into the chamber, the portion of said shank in the chamber being enlarged, said valve having a head thereon engaging the shoulder about the reduced bore, means to normally urge the valve against the shoulder, means to close the outer end of said chamber, the other leg of said body having a bore communicating with said chamber, the outer end of said bore being threaded, a hollow sleeve engaging said last mentioned threads, a control member arranged in said sleeve, said control member having a diameter less than the internal diameter of the sleeve, said control member projecting beyond the sleeve and having a hook thereon, the inner end of said control member having a head thereon, and means to normally urge the control member inwardly into the chamber, said valve shank being disposed in the path of said control member whereby the control member moves the valve.

8. A poultry watering apparatus comprising a body having a chamber therein and having a pair of bores communicating with said chamber, one of said bores having a reduced portion forming a shoulder, a plug in the outer end of said one bore, said plug having an axial hole therein, the free end portion of said body about said one bore being externally threaded and adapted to be attached to a supply pipe, a valve member having a head in said one bore and having a shank extending through said reduced bore and into the chamber, the portion of said shank in the chamber being enlarged, a spring in said one bore, said spring engaging said valve and said plug to normally urge the valve head against the shoulder, the outer end of said other bore being threaded, a hollow sleeve engaging said last mentioned threads, a lock nut engaging said sleeve to hold the latter in place, a control member arranged in said sleeve and extending into said second bore, said control member having a diameter less than the internal diameter of the sleeve, said control member projecting beyond the sleeve and having a hook thereon, a water receptacle removably mounted on said hook, the inner end of said control member having a head thereon, and a spring surrounding the control member and engaging the control member head and the sleeve to normally urge the control member inwardly into the chamber, said control member head being disposed to move in a path whereby it engages the enlarged inner end of the valve shank to thereby unseat the valve.

9. A poultry watering apparatus comprising an L-shaped body, one leg of said L having an outwardly opening bore therein, the outer end of said bore being threaded, a plug in the threaded portion of said bore, said plug having an axial hole therethrough, the free end portion of said one leg being externally threaded and adapted to be attached to a supply pipe, said one leg having a reduced bore at the inner end of said first bore, said body having a chamber communicating with said reduced bore, said reduced bore providing a shoulder, a valve having a shank extending through said reduced bore and into the chamber, the portion of said shank in the chamber being enlarged, said valve having a head thereon engaging the shoulder about the reduced bore, a spring in said first bore between said valve and said plug to normally urge the valve against the shoulder, a closure in said body at the outer end of said chamber, the other leg of said body having a bore therethrough and communicating with said chamber, the outer end of said bore being threaded, a hollow sleeve engaging said last mentioned threads, a lock nut engaging said sleeve to hold the latter in place, a control member arranged in said sleeve, said control member having a diameter less than the internal diameter of the sleeve, said control member projecting beyond the sleeve and having a hook thereon, a water receptacle removably mounted on said hook, the inner end of said control member having a head thereon, and a spring surrounding the control member and engaging the control member head and the sleeve to normally urge the control member inwardly into the chamber, said valve shank being disposed in the path of said control member head.

JESSE NULL.